Sept. 11, 1951         A. T. VAN URK     2,567,660
CORELESS MOVING COIL SYSTEM, MORE PARTICULARLY
FOR MEASURING INSTRUMENTS
Filed July 20, 1946

INVENTOR.
AREND THOMAS van URK.
BY
Fred M. Vogel
AGENT

Patented Sept. 11, 1951

2,567,660

UNITED STATES PATENT OFFICE 2,567,660

CORELESS MOVING COIL SYSTEM, MORE PARTICULARLY FOR MEASURING INSTRUMENTS

Arend Thomas van Urk, Eindhoven, Netherlands, assignor to Hartford National Bank and Trust Company, Hartford, Conn., as trustee Application July 20, 1946, Serial No. 685,165
In the Netherlands December 1, 1943

Section 1, Public Law 690, August 8, 1946
Patent expires December 1, 1963

6 Claims. (Cl. 171—95)

This invention relates to a coreless moving coil system, more particularly for measuring instruments, wherein the coil moves between the poles of a magnetic field and a non-linear, more particularly a logarithmic, relation exists between the angular displacement of the coil and a magnitude acting upon the system.

The invention has for its object to provide a coil system which enables to obtain between the different values of the said magnitude, for example, the intensity of the current passing through the coil, ratios up to about 1:100, for example for the purpose of being able to measure it with sufficient accuracy, on the understanding that in a measuring instrument equal percentage-wise differences in the current intensity can be read off with equal accuracy at the beginning and at the end of the scale. It is thus possible to produce, for example a so-called decibelmeter for about 40 decibels. A decibelmeter is understood to mean here a measuring device with which the above-mentioned logarithmic relation exists between the angular displacement and the magnitude acting upon the system. A system of this kind has, so far as is known, never been realized up to the present. The possibility of reading off ratios as referred to before up to about 1:100 depends on the possibility of obtaining the required change of the field in a range equal to the maximum angular displacement of the coil.

According to the invention, this may be achieved with the aid of a system, wherein the thickness of the pole shoes is substantially equal to a distance varying between the width of the air gap and one quarter thereof and wherein on their sides facing one another the pole shoes are substantially convexly curved in planes normal to the axis of rotation.

In certain cases it is not necessary to exclude convex curvature in sectional planes through the pole shoes which are parallel to the axis of rotation of the coil. It is evident that in this case care must be taken to ensure that, as is customary, the coil can move at a short distance past the surfaces of the pole shoes. It is, moreover, desirable that the shape of the cross-section of the plurality of conductor elements determining the couple should be such that during the movement of the coil these conductor elements are together present at any instant in a part of the field whose field strength varies slightly from point to point. This means practically that the dimensions of the said cross-section are in all directions approximately equal and comparatively small with respect to the width of the pole shoes.

The convex curvature in planes normal to the axis of rotation is preferably provided in such a manner that each of the ends of both pole shoes forms part of the surface of a circular cylinder, because this form is, in general, most easily realizable and yields satisfactory results.

In one model of a 40 decibel meter constructed in practice the ratio between the width of the pole shoes and the width of the air gap amounted to about ⅔, owing to which a particularly favourable field variation was obtained.

There exists, of course, a certain connection between the field variation over the range of the angular displacement and the size of the radius or radii of curvature which determine the curvature of the pole shoes and the width of that part of the pole shoes over which the convexly curved part extends.

According to a further feature of the invention the convexly curved part extends approximately over the whole width of the pole shoes, owing to which a very strong effect is obtained.

In view of the latter, the width of the coil is comparatively small with respect to the width of the pole shoes, so that the coil rotates to beyond the pole shoes only after comparatively large angular displacements. It may occur that, as a result of the utilized curvature of the pole shoes, the field is weaker at the end of the scale than is required for the desired course of the scale division. According to the invention, it is advisable in these cases to provide each of the pole shoes either on one or on both sides with an auxiliary pole piece which yields the desired correction of the field variation. This will be set out in detail in the description of the drawing. These auxiliary pole pieces are preferably slidable along the pole shoes, which facilitates the exact adjustment of the desired field variation.

With the aid of the above-mentioned indications it has been proved possible to realize a decibel meter having a scale division wherein none of the scale portions diverged by more than 25% from the average value.

The invention will be described with reference to the drawing in which:

Fig. 3b shows in plan a modification of the system shown in Fig. 3a.

Figure 1:
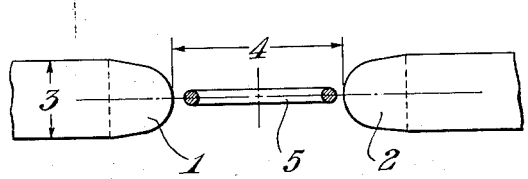
Fig. 1 shows a diagrammatic plan view of a coreless moving coil system according to the invention.

Fig. 1 represents a coreless moving coil system for direct-current measuring instruments according to the invention. Pole shoes 1 and 2, which are interconnected by a permanent magnet (not shown), have a width 3 which in the case illustrated is approximately equal to half the width 4 of the air gap, whilst furthermore on their sides facing one another the pole shoes are curved substantially convexly. The rectangular coil is designated by 5 and comprises a plurality of conductor elements or current wires rotatably mounted in the air-gap between the pole pieces 1 and 2. As a result of the convex curvature of the pole pieces, the coil rotates in a field of non-uniform flux density so that the torque exerted on the coil varies with respect to the angular displacement of the coil. At any instant, however, during the angular displacement of the coil, the coil having a small cross-section, it is present in a field of uniform flux density.

Figure 2A:
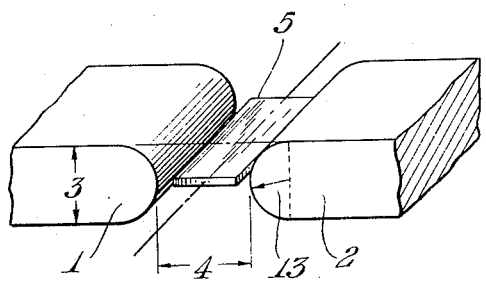
Fig. 2a shows in perspective a coil system in which the poles are convexly shaped in planes perpendicular to the coil.
Figure 2B:
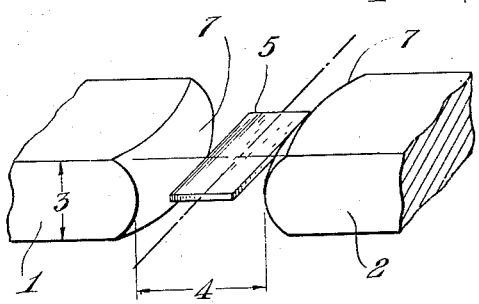
Fig. 2b shows in perspective a coil system in which the poles have a convex curvature both parallel and perpendicular to the coil.

In the construction shown in Figs. 2a and 2b, the polepieces 1 and 2 are convexly shaped in planes perpendicular to the coil axis. The width 3 of the pole-shoes is chosen as 15 mms. for a gap width 4 of 20 mms. and the shoes have a radius of curvature 13 of 7.5 mms., the cross-section 14 (Figs. 3a and 3b) of the coil 5 being 1 sq. mm. In Fig. 2a, the pole-shoes are curved only in planes perpendicular to the coil axis while in Fig. 2b, the curvature of the pole-pieces has a rounded shape, the face of the pole-piece also being convexly shaped in plane parallel to the coil axis.

Figure 3A:
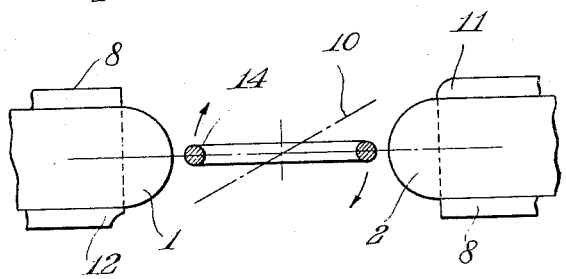
Fig. 3a shows in plan a coil system provided with auxiliary pole-pieces.
Figure 3B:
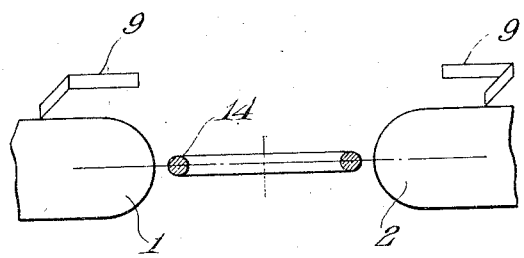

In Fig. 3a the pole shoes 1 and 2 are provided with an auxiliarly pole piece 8 on one of their sides, viz. on that side of the pole shoe which is passed by the coil when the latter rotates about the axis of rotation. These auxiliary pole shoes may also be arranged at some distance from the pole shoes, as is indicated in Fig. 3b at 9. The auxiliary pole pieces are preferably slidable. They may also be provided on either side of the pole shoes, more particularly when the coil 5 in its neutral position is not in the ordinary intermediate position but occupies, for example, the preliminary position designated by a dotted line 10.

Auxiliary pole pieces 11 and 12 are shown with a rounded shape, the curvature being either convex or concave.

What I claim is:

1. A coreless moving coil system for non-linear measuring instruments comprising a pair of spaced apart convexly curved pole members of opposite polarity having a common axis and defining an air-gap therebetween having a given dimension in a given direction, said pole members having a thickness dimension approximately two-thirds that of said given dimension in said air-gap, a coil member, rotatable in the air-gap about an axis intersecting the axis of the pole members, said pole members being curved cylindrically over the entire width thereof in planes normal to said axis of rotation to provide a field of substantially non-uniform distribution in the air-gap, said coil member comprising a plurality of conductor elements having a given cross-sectional dimension which is substantially less than the thickness of said pole members whereby for any given angular displacement of the coil member the conductor elements are located in a field of substantially uniform distribution.

2. A coreless moving coil system for non-linear measuring instruments comprising a pair of spaced apart convexly curved pole members of opposite polarity having a common axis and defining an air-gap therebetween having a given dimension in a given direction, a coil member rotatable in the air-gap about an axis intersecting the axis of the pole members, the thickness of each of said pole members being substantially greater than one-fourth of and less than said given dimension, said pole members being curved in planes normal to said axis of rotation to provide a field of non-uniform distribution in the air-gap, and said coil member comprising a plurality of conductor elements having a given cross-sectional dimension which is less than the thickness of said pole members whereby for any position of the coil member, the conductors are located in a field of substantially uniform distribution.

3. A coreless moving coil system for non-linear measuring instruments comprising a pair of spaced apart pole members having a common axis and defining an air-gap therebetween having a given dimension in a given direction, a coil member rotatable in the air-gap about an axis intersecting the axis of the pole members, the thickness of each of said pole members being substantially greater than one-fourth of and less than the given dimension, the pole members being curved cylindrically in planes normal to the axis of rotation to provide a field of substantially non-uniform distribution in the air-gap, and the coil member comprising a plurality of conductor elements having a given cross-sectional dimension which is less than the thickness of the pole members whereby the conductor elements are located in a field of substantially uniform distribution.

4. A coreless moving coil system for non-linear measuring instruments comprising a pair of spaced apart convexly curved pole members of opposite polarity defining an air-gap therebetween having a given dimension in a given direction, a coil member rotatable in the air-gap about an axis intersecting the axis of the pole members, the thickness of each of said pole members being substantially greater than one-fourth of and less than said given dimension, said pole members being curved cylindrically over the entire thickness thereof in planes normal to the said axis of rotation, to provide a field of substantially non-uniform distribution in the air-gap, the coil member comprising a plurality of conductor elements having a given cross-sectional dimension which is substantially less than the thickness of the pole members whereby for any given angular displacement of the coil member, the conductor elements are located in a field of substantially uniform distribution.

5. A coreless moving coil system for non-linear measuring instruments comprising a pair of spaced apart convexly curved pole members of opposite polarity having a common axis and defining an air-gap therebetween having a given dimension in a given direction, a coil member rotatable in the air-gap about an axis intersecting the axis of the pole members, the thickness of each of the pole members being greater than one-fourth of and less than said given dimension, said pole members being curved cylindrically over the entire thickness thereof in planes normal to the axis of rotation to provide a field of substantially non-uniform distribution in the air-gap, said coil member comprising a plurality of conductor elements having a given cross-sectional dimension which is substantially less than the thickness of the pole members whereby for a given angular displacement of the coil member, the conductor elements are located in a field of substantially uniform distribution, and an auxiliary pole member in close proximity to said main pole members.

6. A coreless moving coil system for non-linear measuring instruments comprising a pair of spaced apart convexly curved pole members of opposite polarity having a common axis and defining an air-gap therebetween having a given dimension in a given direction, a coil member rotatable in the air-gap about an axis intersecting the axis of the pole members, the thickness of each of the pole members being substantially greater than one-fourth of and less than said given dimension, said pole members being curved cylindrically over the entire thickness thereof in planes normal to the axis of rotation to provide a field of substantially non-uniform distribution in the air-gap, said coil member comprising a plurality of conductor elements having a given cross-sectional dimension which is substantially less than the thickness of the pole members whereby for a given angular displacement of the coil member, the conductor elements are located in a field of substantially uniform distribution, and auxiliary pole members slidably secured to each of said pole members.

AREND THOMAS van URK.

REFERENCES CITED

The following references are of record in the file of this patent:

UNITED STATES PATENTS

| Number | Name | Date |
|---|---|---|
| 570,454 | Coleman | Nov. 3, 1896 |
| 657,861 | Darwin et al. | Sept. 11, 1900 |
| 1,671,473 | Jacobson | May 29, 1928 |
| 1,932,911 | Rolfe | Oct. 31, 1933 |
| 2,045,677 | Schock | June 30, 1936 |

FOREIGN PATENTS

| Number | Country | Date |
|---|---|---|
| 10,265 | Great Britain | May 6, 1893 |
| 75,503 | Germany | June 4, 1894 |
| 518,919 | Great Britain | Mar. 12, 1940 |